United States Patent
Khan et al.

(10) Patent No.: US 10,502,475 B2
(45) Date of Patent: Dec. 10, 2019

(54) REFRIGERATED CONTAINER AND DUCT EXTENSION

(71) Applicant: Carrier Corporation, Farmington, CT (US)

(72) Inventors: Shafi N. Khan, Liverpool, NY (US); Peter R. Bushnell, Cazenovia, NY (US); Richie C. Stauter, Fayetteville, NY (US); Dale R. Fine, Cicero, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 848 days.

(21) Appl. No.: 14/786,283

(22) PCT Filed: Apr. 11, 2014

(86) PCT No.: PCT/US2014/033726
§ 371 (c)(1),
(2) Date: Oct. 22, 2015

(87) PCT Pub. No.: WO2014/176044
PCT Pub. Date: Oct. 30, 2014

(65) Prior Publication Data
US 2016/0076806 A1 Mar. 17, 2016

Related U.S. Application Data

(63) Continuation-in-part of application No. PCT/US2013/053892, filed on Aug. 7, 2013.
(Continued)

(51) Int. Cl.
*F25D 17/08* (2006.01)
*B60P 3/20* (2006.01)
(Continued)

(52) U.S. Cl.
CPC ......... *F25D 17/08* (2013.01); *B60H 1/00014* (2013.01); *B60H 1/00557* (2013.01);
(Continued)

(58) Field of Classification Search
CPC .... F24F 13/02; F24F 13/0209; F24F 13/0236; F24F 13/0254; B60H 1/00014; B60H 1/00564; F25D 11/003; F25D 2317/0672
(Continued)

(56) References Cited

U.S. PATENT DOCUMENTS

| | | |
|---|---|---|
| 3,100,384 A | 8/1963 | Lowensohn |
| 3,447,336 A | 6/1969 | Gramse |

(Continued)

FOREIGN PATENT DOCUMENTS

| | | |
|---|---|---|
| DE | 19623765 A1 | 12/1997 |
| EP | 1122191 A2 | 8/2001 |

(Continued)

OTHER PUBLICATIONS

ILLIG: Thermoformed, Soft Air Ducts Are Picking Up Speed, obtained from https://plasticker.de/Plastics_News_10923_ILLIG_Thermoformed_Soft_Air_Ducts_Are_Picking_Up_Speed (Year: 2010).*
(Continued)

*Primary Examiner* — Orlando E Aviles
(74) *Attorney, Agent, or Firm* — Bachman & LaPointe, P.C.

(57) ABSTRACT

A duct (100) comprises the molded combination of: an inlet flange (110) surrounding an inlet (102), the inlet having a height and a width; and body (112) extending from the inlet to an outlet (104) and having a body interior that laterally outwardly diverges and upwardly shifts from the inlet toward the outlet.

13 Claims, 6 Drawing Sheets

Related U.S. Application Data

(60) Provisional application No. 61/814,699, filed on Apr. 22, 2013, provisional application No. 61/692,066, filed on Aug. 22, 2012.

(51) Int. Cl.
| | |
|---|---|
| *B60H 1/00* | (2006.01) |
| *F25D 17/00* | (2006.01) |
| *F16L 9/12* | (2006.01) |
| *B65D 88/74* | (2006.01) |
| *F25D 11/00* | (2006.01) |

(52) U.S. Cl.
CPC .......... *B60P 3/20* (2013.01); *F16L 9/12* (2013.01); *F25D 17/005* (2013.01); *B65D 88/745* (2013.01); *F25D 11/003* (2013.01); *F25D 2317/063* (2013.01); *F25D 2317/067* (2013.01); *F25D 2500/02* (2013.01)

(58) Field of Classification Search
USPC .................................................. 454/141, 142
See application file for complete search history.

(56) References Cited

U.S. PATENT DOCUMENTS

| | | | |
|---|---|---|---|
| 3,992,892 A | 11/1976 | Sain et al. | |
| 4,887,437 A | 12/1989 | Fenton et al. | |
| 5,114,767 A | 5/1992 | Bems et al. | |
| 5,176,303 A * | 1/1993 | Franke | A45F 3/08 224/148.2 |
| 5,407,632 A * | 4/1995 | Constantino | B29C 51/006 264/545 |
| 5,427,237 A | 6/1995 | Kiefer et al. | |
| 5,533,275 A | 7/1996 | Lawton | |
| 5,814,185 A | 9/1998 | Chun et al. | |
| 5,899,084 A | 5/1999 | Franaszek et al. | |
| 5,946,933 A | 9/1999 | Clarke et al. | |
| 5,980,379 A | 11/1999 | Shibata | |
| 6,116,044 A | 9/2000 | Gothier | |
| 6,186,078 B1 | 2/2001 | Brown | |
| 6,269,652 B1 | 8/2001 | Grosskopf | |
| 6,309,012 B1 | 10/2001 | Fryk et al. | |
| 6,508,076 B1 | 1/2003 | Gast et al. | |
| 8,181,476 B2 | 5/2012 | Khan et al. | |
| 2002/0058082 A1 | 5/2002 | Muirhead | |
| 2004/0197547 A1 | 10/2004 | Bristow et al. | |
| 2005/0215189 A1 | 9/2005 | Nelson et al. | |
| 2006/0248915 A1 | 11/2006 | Lee | |
| 2010/0152361 A1 | 6/2010 | Weaver et al. | |
| 2010/0316487 A1 | 12/2010 | Presz, Jr. | |
| 2011/0011115 A1* | 1/2011 | Bushnell | B60H 1/00014 62/323.3 |
| 2011/0073250 A1 | 3/2011 | Muirhead | |
| 2011/0129667 A1 | 6/2011 | Botros et al. | |
| 2011/0277926 A1 | 11/2011 | Polk, Jr. | |
| 2012/0148803 A1 | 6/2012 | Schleiermacher et al. | |
| 2013/0174934 A1* | 7/2013 | Duffy | F24F 13/0209 138/149 |
| 2015/0202945 A1 | 7/2015 | Bushnell et al. | |

FOREIGN PATENT DOCUMENTS

| | | |
|---|---|---|
| EP | 1930211 A2 | 6/2008 |
| JP | 2002154314 A | 5/2002 |
| JP | 2008202912 A | 9/2008 |
| KR | 20070005263 A | 1/2007 |
| WO | 2006104491 A1 | 10/2006 |
| WO | 2008027137 A1 | 3/2008 |
| WO | 2011008582 A1 | 1/2011 |
| WO | 2014031338 A1 | 2/2014 |

OTHER PUBLICATIONS

Ameriform, picture of twin sheet portable toilet cross section, obtained from http://www.ameriform.us/capabilities.html (Year: 2003).*
Polymer Properties Database, Polyolefins (Polyalkenes), retrieved from https://polymerdatabase.com/polymer%20classes/Polyolefin%20type.html (Year: 2015).*
International Search Report the Written Opinion of the International Searching Authority PCT/US2013/053892, dated Oct. 23, 2013.
International Search Report and Written Opinion of the International Searching Authority PCT/US2014/033726, dated Jul. 4, 2014.
Applicant-admitted prior art: Brochure: "Chutes & Adapters", Oct. 31, 2014, Insulated Transport Products, LaGrange, Georgia.
Brochure: "UniFlow Air Chutes", Jul. 2, 2010, FG Products, Inc., Rice Lake, Wisconsin.
Twin sheet Thermoforming, Society of Plastics Engineers, downloaded Feb. 26, 2013, http://www.4spe.org/plastics-encyclopedia/twin-sheet-thermoforming.
"UniMax Adapter", Mar. 8, 2013, ITW Insulated Products, LaGrange, Georgia.
"Thermo King Adds New Products to PrimAir Air Management Systems", Refrigerated Transporter, Nov. 9, 2009, retrieved May 2, 2016 from: http://refrigeratedtransporter.com/fleet-equipment/thermo-king-adds-new-productsto-primair-air-management-systems, Penton Media, Inc., New York, New York.
Applicant Admitted Prior Art: Brochure: "The Tube Chute", Oct. 31, 2014, Insulated Transport Products, LaGrange, Georgia.
Youtube clip, uploaded by FGProductsInc., "Uni-Flow Air Chute Advantage", accessed Feb. 2, 2015, http://www.youtube.com/watch?v=10(GXrYMSRM, 2 pages.
Non-Final Office Action dated Aug. 24, 2017 for U.S. Appl. No. 14/422,964.
European Office Action dated Nov. 30, 2018 for European Patent Application No. 14722074.3.

* cited by examiner

REFRIGERATED CONTAINER AND DUCT EXTENSION

CROSS-REFERENCE TO RELATED APPLICATION

Benefit is claimed of U.S. Patent Application Ser. No. 61/814,699, filed Apr. 22, 2013, and entitled "Refrigerated Container and Duct Extension", the disclosure of which is incorporated by reference herein in its entirety as if set forth at length.

BACKGROUND

The disclosure relates to transport refrigeration. More particularly, the disclosure relates to air handling in transport refrigeration systems.

Transport refrigeration systems include cargo/shipping containers, trailers, and trucks. Each involves one or more refrigerated compartment and a refrigeration system positioned to cool a recirculating airflow within the compartment. Depending upon the implementation, refrigeration equipment may be mounted to an exterior of the container or within a subcompartment in the container.

Many truck and trailer configurations mount the equipment to the front of the container, often high on the front wall so that the outlet for discharging cooled air into the compartment is near the compartment ceiling.

It has been proposed to use a duct extension or chute (duct) to discharge cooled air further back in the container. In one example, a blow-molded open-top duct has a forward flange that mates to the equipment compartment and an upper flange that mates to the ceiling. The duct body transitions from a rectangular (bottom and two sides) portion near the inlet flange to an arcuate cross-section near a rear rim.

SUMMARY

One aspect of the disclosure involves a duct comprising the molded combination of an inlet flange and a body. The inlet flange surrounds an inlet having a height and a width. The body extends from the inlet to an outlet and has a body interior that laterally outwardly diverges and upwardly shifts from the inlet toward the outlet.

In one or more embodiments of any of the foregoing embodiments, the duct comprises thermoplastic polyolefin.

In one or more embodiments of any of the foregoing embodiments, the duct is twin-sheet thermoformed.

In one or more embodiments of any of the foregoing embodiments, the duct comprises a proximal trunk and a plurality of distal branches.

In one or more embodiments of any of the foregoing embodiments, a plurality of walls divide the distal branches, each wall comprising at least one portion protruding upward from a bottom of the body and at least one portion protruding downward from a top of the body and meeting.

In one or more embodiments of any of the foregoing embodiments, one or more of the walls includes an interrupted portion wherein the wall protrudes upward from the bottom of the duct to a non-recessed location on the top of the duct.

In one or more embodiments of any of the foregoing embodiments, the interrupted portion includes a mounting hole.

In one or more embodiments of any of the foregoing embodiments, the duct further comprises a plurality of tabs at the outlet, each tab includes a mounting a hole.

Another aspect of the disclosure involves a transport refrigeration system including the duct of any of the foregoing embodiments and further comprising: a container and a refrigeration system. The refrigeration system includes: a fan for driving air along a flowpath from an inlet to an outlet; and a heat exchanger along the flowpath for cooling the air. The duct is mounted so that its inlet receives air from the refrigeration system outlet.

In one or more embodiments of any of the foregoing embodiments, the refrigeration system is mounted along a front wall of the container.

In one or more embodiments of any of the foregoing embodiments, the duct comprises a proximal trunk and a plurality of distal branches.

Another aspect of the disclosure involves a method for making the duct of any of the foregoing embodiments. The method comprises: providing a first sheet and a second sheet; vacuum thermoforming the first sheet and the second sheet; and pressing the thermoformed first sheet and thermoformed second sheet together so as to fuse the first and second sheets together.

Another aspect of the disclosure involves a method for using the duct of any of the foregoing embodiments. The method comprises attaching the flange to an outlet of a refrigeration system of a transport container.

In one or more embodiments of any of the foregoing embodiments, the method further comprises attaching the duct body to a ceiling of the container.

In one or more embodiments of any of the foregoing embodiments, the attaching the duct body to the ceiling comprises screwing through tabs protruding from an upper portion of the duct at the outlet.

In one or more embodiments of any of the foregoing embodiments, the attaching of the duct body to the ceiling comprises screwing through upwardly projecting pockets.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1A is an enlarged view of an equipment box region on the system of FIG. 1.

Like reference numbers and designations in the various drawings indicate like elements.

DETAILED DESCRIPTION

Figure 1:
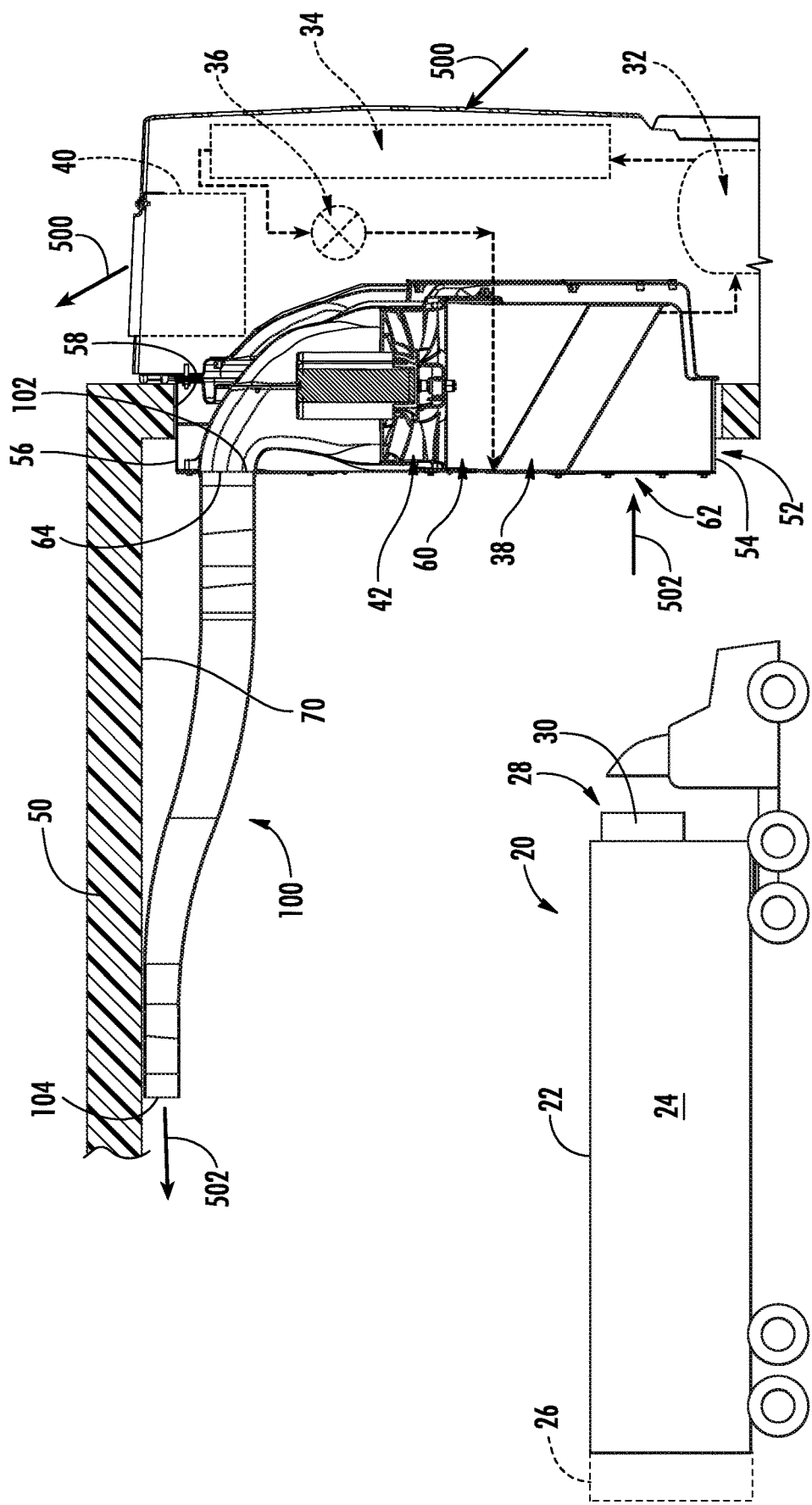
FIG. 1 is a simplified side sectional view of a refrigerated transport system.

FIG. 1 shows a refrigerated transport system in the form of a trailer 20 having a container in the form of box 22 with an interior 24. In the exemplary box, a pair of doors 26 are formed at a rear of the box. An equipment compartment 28 is located along a front of the box and contains the refrigeration system 30.

The exemplary refrigeration system 30 includes a vapor compression system comprising a compressor 32. Sequentially downstream of the compressor along the refrigerant flowpath are a heat rejection heat exchanger 34 (e.g., condenser or gas cooler), an expansion device 36 (e.g., electronic expansion valve (EEV)), and a heat absorption heat exchanger (evaporator) 38. These are connected via an appropriate refrigerant line. The exemplary heat exchangers are refrigerant-air heat exchangers and may have associated fans 40, 42 driving air flows thereacross. An exemplary air flow across the condenser 34 is shown as 500 and an exemplary air flow across the evaporator is shown as 502. In various implementations, the box may also contain a power source such as an internal combustion engine driving an electric generator to, in turn, power the compressor and fan(s). Alternative implementations, may involve use of vehicle electric power.

An exemplary box 22 is formed of an insulated wall structure 50 on the front, top, bottom, and left and right sides with the doors 26 also being insulated. The exemplary wall 50 has at least one penetration associated with the refrigeration system. In the exemplary embodiment, the penetration involves a rear protrusion or bay 52 of the equipment box extending from a lower end 54 to an upper end 56 within an aperture 58 of the front wall. The bay 52 defines a duct 60 extending from an inlet 62 low along an aft wall of the bay to an outlet 64 high along the aft wall. Within the duct, along an air flowpath are the evaporator and its associated fan. The exemplary outlet 64 is rectangular having a height and a width. The upper end of the outlet 64 is downwardly spaced from the ceiling 70 of the box.

Figure 2:
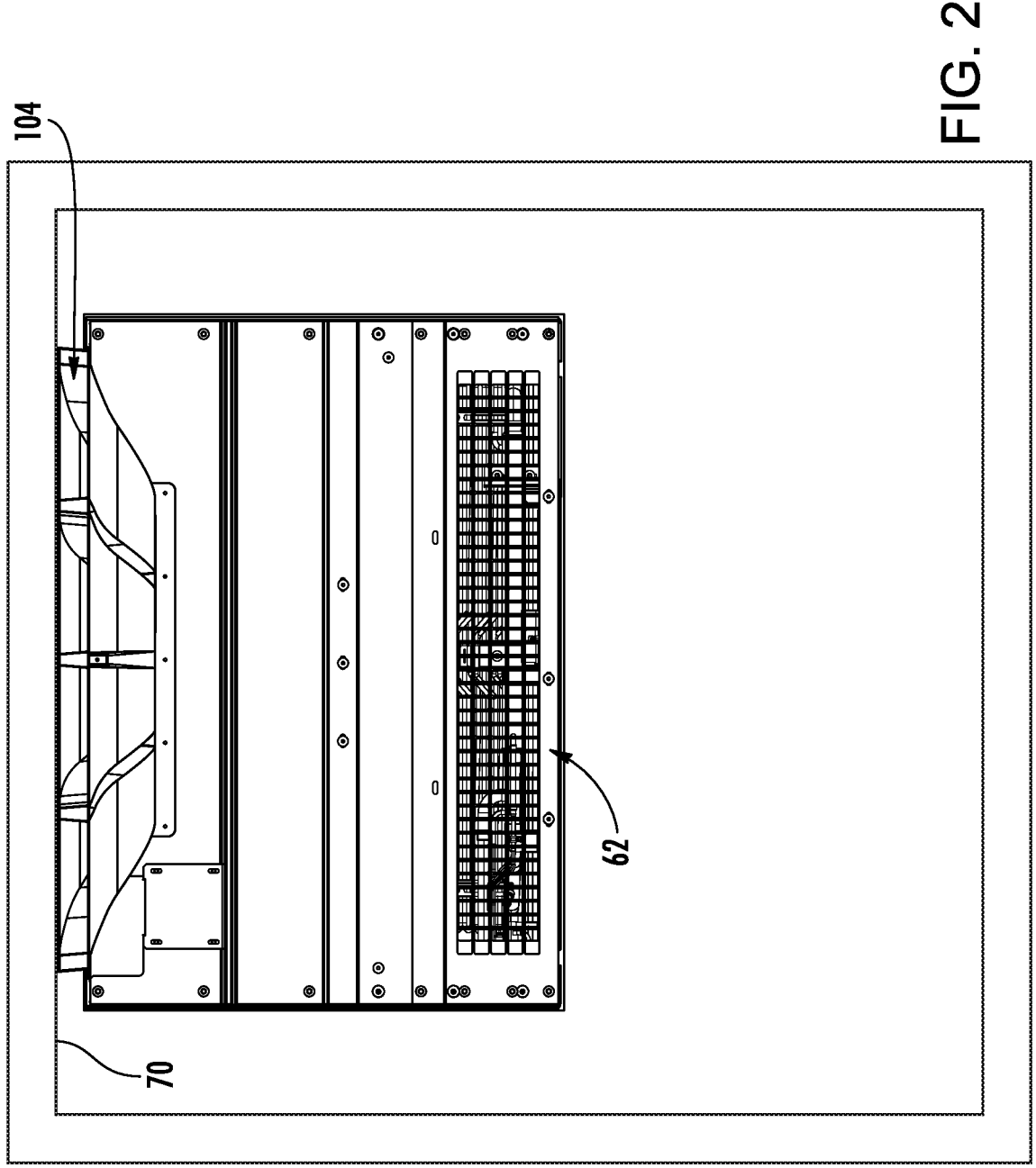
FIG. 2 is an aft oblique view of the equipment box.

To better distribute the air discharged from the outlet 64, a duct extension (duct) 100 is provided having an inlet 102 at the outlet 64 and an outlet 104 spaced forwardly and upwardly therefrom (e.g., adjacent to the ceiling surface 70). FIG. 2 shows a forward portion of the box schematically. In many typical implementations, the box may be taller and wider relative to the refrigeration unit. The outlet 104 has a height and a width. In the exemplary embodiment, the outlet 104's height is less than the height of the outlet 64 and its width is greater than the width of the outlet 64 so that the duct causes an outward fanning or lateral divergence of the outlet flow. This serves to get the flow farther back and more evenly distributed within the compartment.

Figure 3:
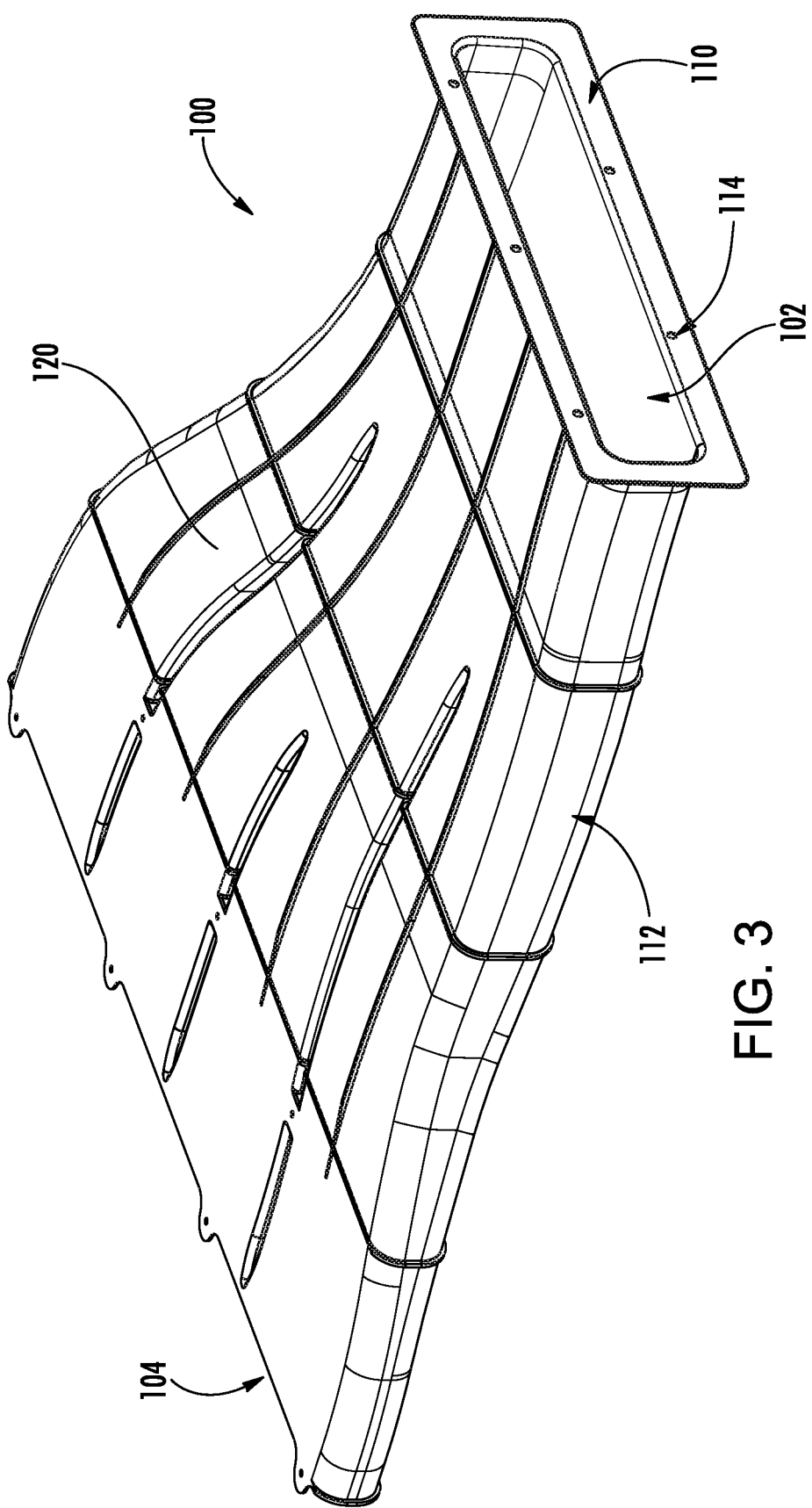
FIG. 3 is a first view of a duct extension.
Figure 4:
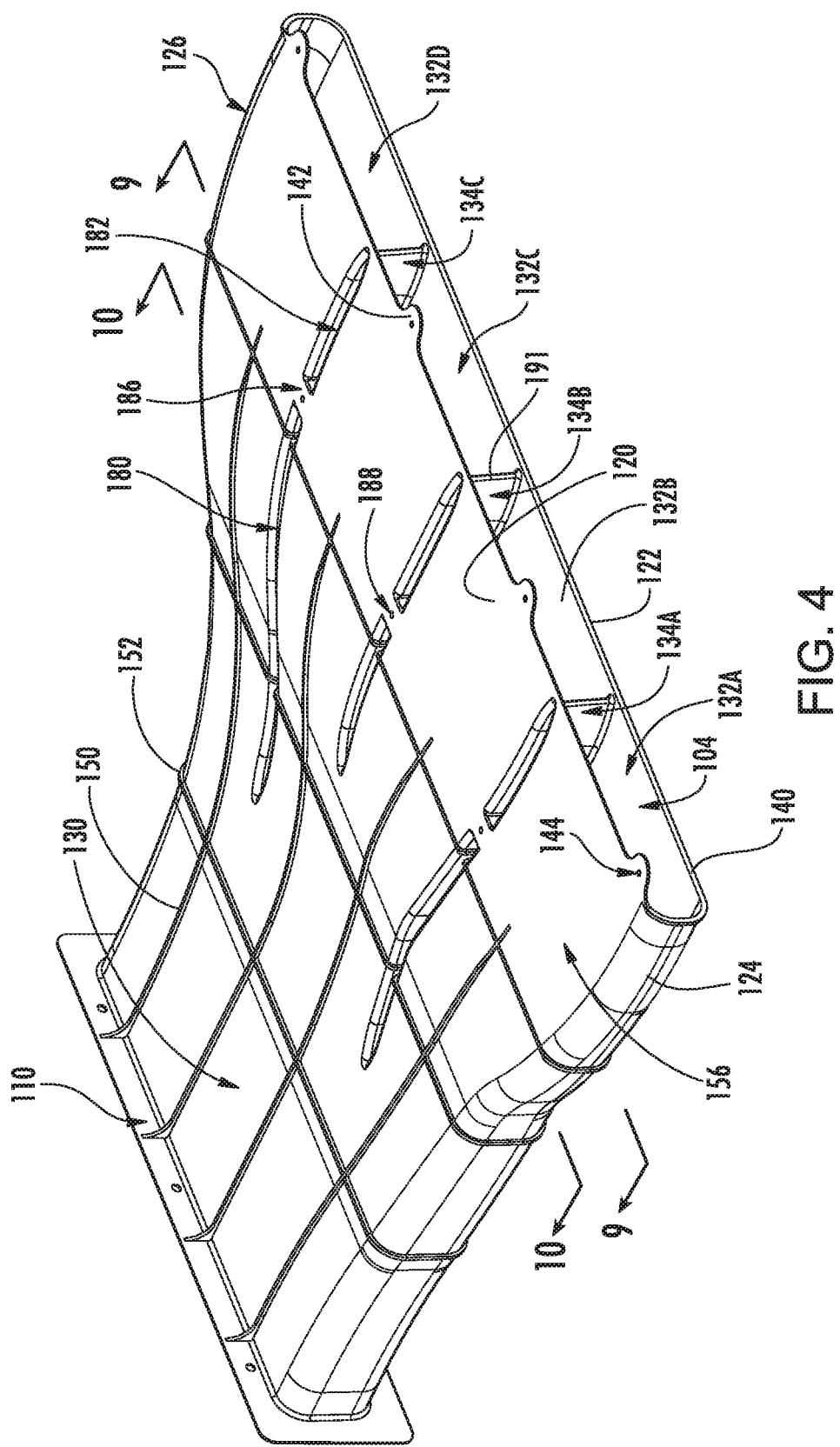
FIG. 4 is a second view of the duct extension.
Figure 5:
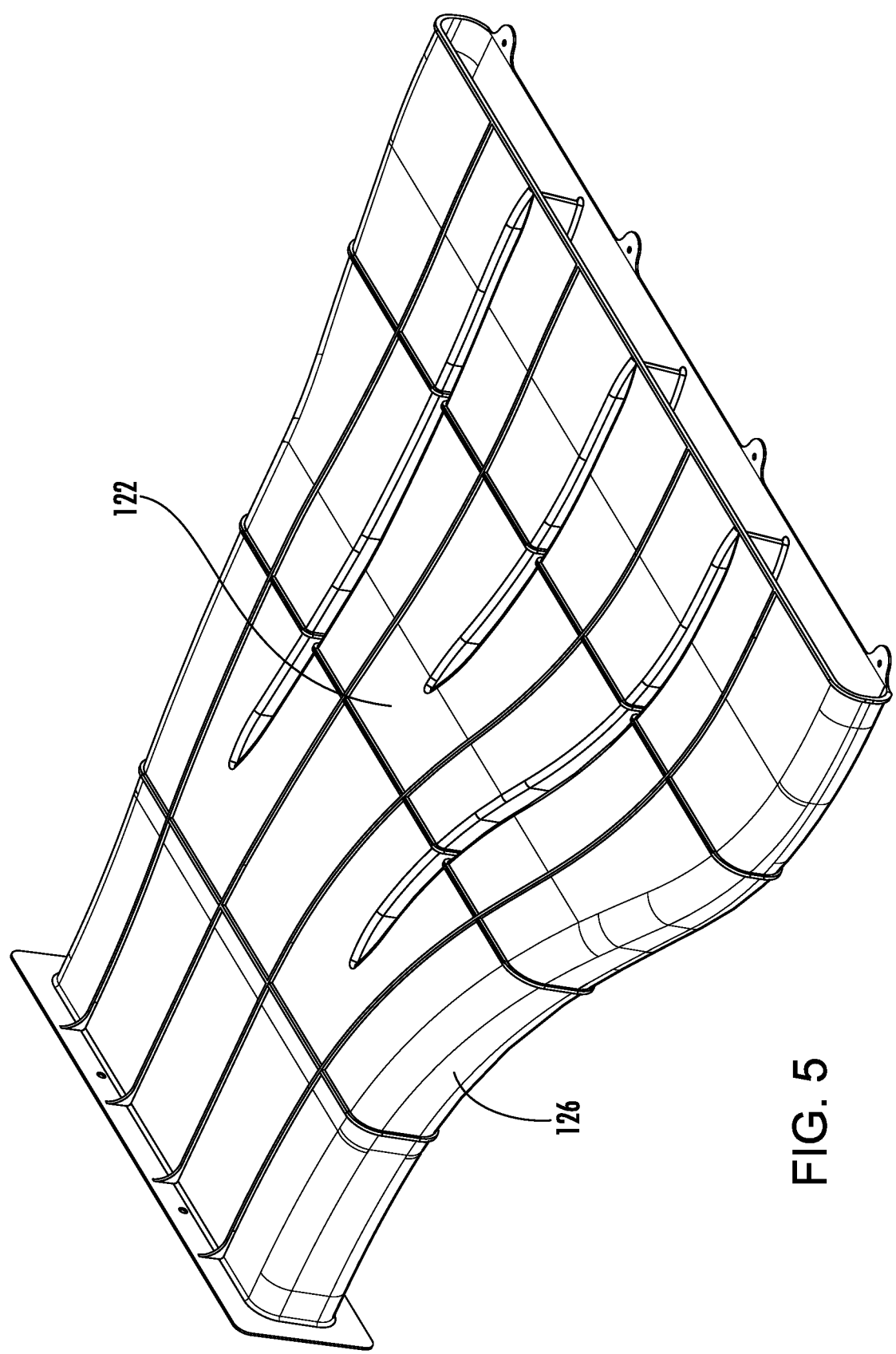
FIG. 5 is a third view of the duct extension.

The exemplary duct 100 (FIG. 3) comprises a mounting flange 110 at the inlet 102 and a duct body 112 extending downstream therefrom to the outlet. The exemplary flange has a perimeter array of mounting holes 114 for securing to the rear wall of the bay 52. FIG. 3 is a perspective view of the duct looking generally downward and rearward from the right front (right and front being viewed from the point of view of the vehicle). FIG. 4 is a generally forward and downward view from the left rear. FIG. 5 is a generally upward and forward view from the right rear. The duct body has an upper wall portion 120 (FIG. 3) and a lower wall portion 122 (FIG. 5) joined by respective left and right wall portions 124 and 126 (FIG. 4). The exemplary duct has a proximal trunk portion 130 which extends downstream from the inlet 102 and flange 110 and branches off into a plurality of branches (e.g., four ultimate branches 132A, 132B, 132C, and 132D being shown from left-to-right). The branches are separated by walls 134A, 134B, and 134C. At a downstream/rear edge 140 of the duct forming the outlet, the duct upper wall portion 120 includes a plurality of mounting tabs 142 each having an associated mounting hole 144 for receiving a screw to fasten the duct to the ceiling.

The exemplary duct also includes a plurality of reinforcing structures including streamwise externally protruding ribs 150 and circumscribing transverse externally protruding ribs 152. A rearmost of the ribs 152 at the downstream/rear edge 140 extends only along the lower wall portion 122 and left and right wall portions 126 but not along the upper wall portion. This allows a downstream region 156 of the upper surface of the upper wall portion to fit flat against the ceiling near the outlet.

Figure 7:
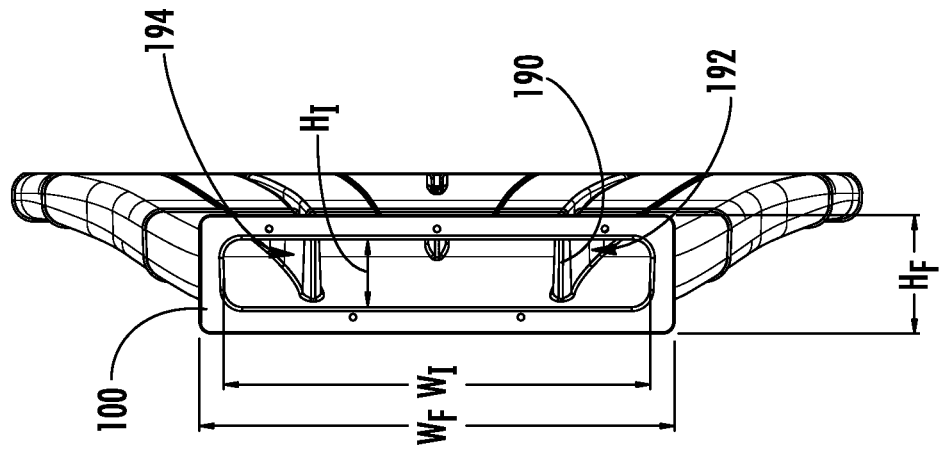
FIG. 7 is a front view of the duct extension.
Figure 6:
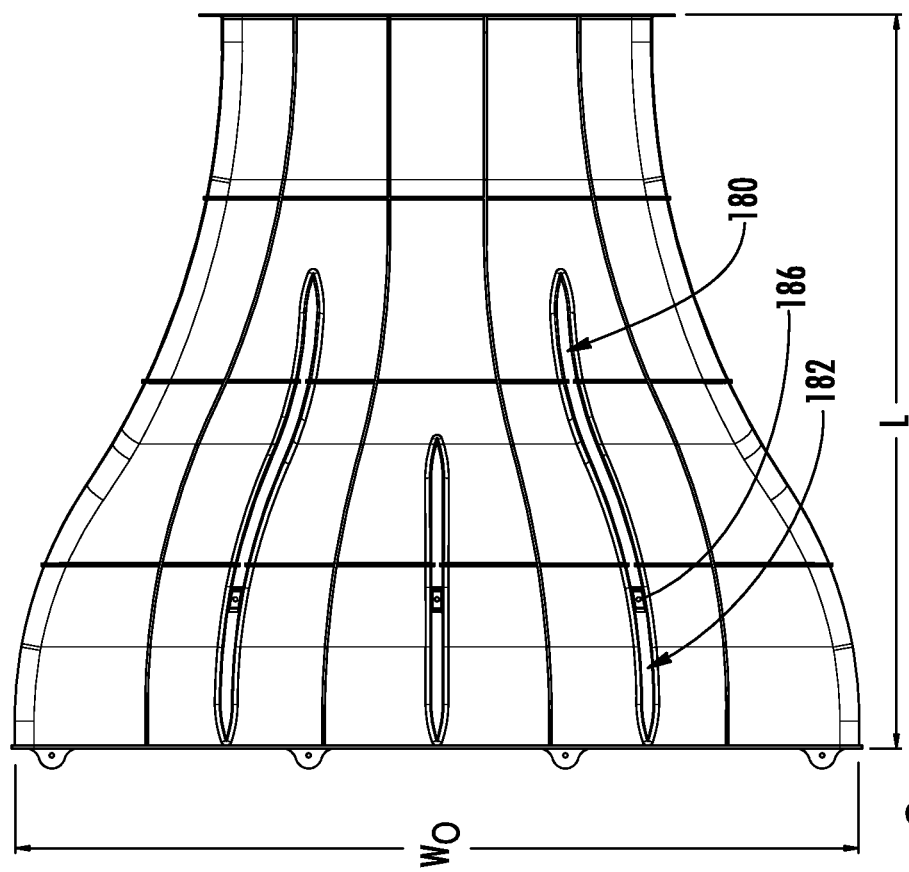
FIG. 6 is a bottom view of the duct extension.
Figure 8:
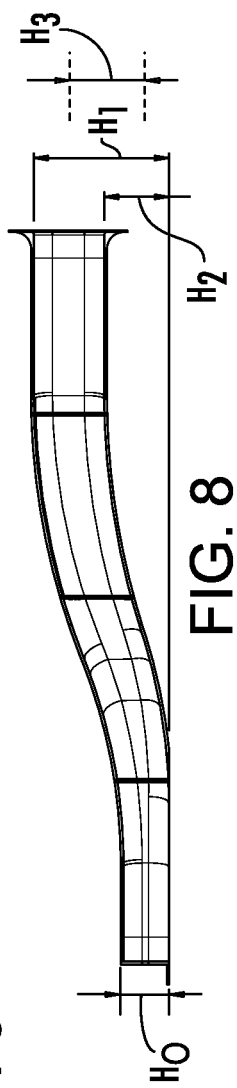
FIG. 8 is a side view of the duct extension.

FIG. 7 shows an inlet width $W_I$ and an inlet height $H_I$. FIG. 7 further shows a flange width $W_F$ and flange height $H_F$. FIG. 6 shows an outlet width $W_O$ and FIG. 8 shows an outlet height $H_O$. Due to the fanning and divergence, the exemplary $W_O$ is at least 50% greater than $W_I$ (e.g., 150%-300% of $W_I$, more narrowly, 180%-250% or an exemplary about 200%). The outlet height $H_O$ may be smaller than the inlet height $H_I$ in approximately the same proportion to maintain flow cross-sectional area. FIG. 8 further shows the amount of upward offsetting of the outlet relative to the inlet. A lower end of the inlet is at a height $H_1$ below the ceiling 70 and an upper end of inlet is at a height $H_2$ below the ceiling 70 whereas the upper end of the outlet is essentially at the ceiling. The exemplary center of the outlet is shifted upward relative to the center of the inlet by an amount $H_3$ which may exceed the outlet height and may exceed the inlet height. The exact offset will depend upon the particular refrigeration system being adapted.

The exemplary duct extension 100 is formed by a twin-sheet vacuum thermo-forming process. In one such process, one sheet generally forms a lower half of the duct and another sheet generally forms an upper half. In an exemplary process, there is an upper mold and a lower mold. These have interior profiles complementary to upper and lower portions of the duct to be molded. An upper sheet and a lower sheet are placed into a space between the molds and may be contacted to the molds. The sheets are heated and drawn against the mold surfaces by vacuum applied through the molds. Thereafter, the molds are brought together to locally contact adjacent portions of the two formed sheets and thermally fuse them. The molded part may then be cooled to harden. The mold may be opened and the part ejected. There may be trimming of flash before and/or after mold separation and part ejection.

The twin sheet vacuum thermoforming facilities a surprisingly robust yet lightweight and inexpensive configuration. For example, the exemplary walls 134A-134C may be formed by deformations in one or both sheets. In this example, along a forward portion 180 of each wall and an aft portion 182, the wall is formed by deformations of both sheets (the lower sheet protruding upward and the upper sheet protruding downward) so that, within the wall, the sheets are fused to form a transverse web at an intermediate height between adjacent portions of the two sheets and their respective associated upper and lower wall portions. In the exemplary embodiment, however, there is an interruption in the wall between the portions 180 and 182. The exemplary interruption is formed by locally having the wall substantially entirely formed by deformation of the lower sheet so that the two sheets fuse at a location (small local region) 186 (FIG. 4) locally coplanar with the upper wall. This location 186 is along the flat end portion 156 of the upper wall near a forward end thereof. This allows the locations 186 to provide further attachment points for fastening the duct to the ceiling.

Turning to FIG. 7, it is seen that each wall extends from a leading edge 190 to a trailing edge 191 (FIG. 4). Each wall includes a left side 192 and a right side 194. These sides 192 and 194 can extend continuously across the portions or regions 180, 186, and 182. Viewed from the top in FIG. 4, the regions 180 and 182 are upwardly directed recesses while the region 186 is flat and unrecessed. Viewed, however, from the bottom in FIGS. 5 and 6, there is one continuous recess spanning all three regions/portions 180, 182, and 186 with region 186 representing an upward deepening. At the regions 186, the web of joined material may have a mounting hole 188 (FIG. 4) to receive an additional screw. The screw may be inserted upwardly into the deepened area of the compartment and threaded into the ceiling. This provides a robust attachment of the duct while minimizing internal interruptions in flow or otherwise compromising the structural integrity provided by the walls. The walls provide structural integrity by maintaining spacing of the upper and lower wall portions.

The use of "first", "second", and the like in the following claims is for differentiation only and does not necessarily indicate relative or absolute importance or temporal order. Where a measure is given in English units followed by a parenthetical containing SI or other units, the parenthetical's units are a conversion and should not imply a degree of precision not found in the English units. The same "upper" and "lower" orientations are used to describe the duct in its final condition and/or when being molded. This is not a requirement.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A transport refrigeration system comprising:
   a refrigeration system (30) including:
      a fan (42) for driving air along a flowpath from an inlet (62) to an outlet (64); and
      a heat exchanger (38) along the flowpath for cooling the air; and
   a duct (100) comprising a twin-sheet thermoformed combination of:
      an inlet flange (110) surrounding an inlet (102), the duct mounted so that the duct inlet (102) receives air from the refrigeration system outlet, the duct inlet having a height and a width; and
      body (112) extending from the duct inlet to an outlet (104) and having a body interior that laterally outwardly diverges and upwardly shifts from the duct inlet toward the duct outlet wherein:
         the duct comprises a proximal trunk (130) and a plurality of distal branches (132A-132D);
         a plurality of walls (134A-134C) divide the distal branches, each wall comprising at least one portion protruding upward from a bottom of the body and at least one portion protruding downward from a top of the body and meeting; and
         one or more of the walls includes an interrupted portion (186) wherein the interrupted portion of the one or more of the walls protrudes upward from the bottom of the duct to a non-recessed location on the top of the duct.

2. The transport refrigeration system of claim 1 wherein: the duct comprises thermoplastic polyolefin.

3. The transport refrigeration system of claim 1 wherein: the interrupted portion includes a mounting hole (188).

4. The transport refrigeration system of claim 1 further comprising:
   a plurality of tabs (142) at the duct outlet, each tab including a mounting a hole (144).

5. The transport refrigeration system of claim 1 further comprising:
   a container (22).

6. The transport refrigeration system of claim 5 wherein: the refrigeration system is mounted along a front wall of the container.

7. A method for making the transport refrigeration system of claim 1, the method comprising:
   making the duct by:
      providing a first sheet and a second sheet;
      vacuum thermoforming the first sheet and the second sheet; and
      pressing the thermoformed first sheet and thermoformed second sheet together so as to fuse the first and second sheets together.

8. A method for using the transport refrigeration system of claim 1, the method comprising:
   attaching the flange (110) to an outlet (64) of a refrigeration system (30) of a transport container (22).

9. The method of claim 8 further comprising:
   attaching the duct body (112) to a ceiling (70) of the container.

10. The method of claim 9 wherein:
   the attaching the duct body to the ceiling comprises screwing through tabs protruding from an upper portion of the duct at the duct outlet.

11. The method of claim 9 wherein:
   the attaching of the duct body to the ceiling comprises screwing through upwardly-projecting pockets.

12. A transport refrigeration system comprising:
   a refrigeration system (30) including:
      a fan (42) for driving air along a flow path from an inlet (62) to an outlet (64); and
      a heat exchanger (38) along the flowpath for cooling the air; and
   a duct (100) comprising a twin-sheet thermoformed combination of:
      an inlet flange (110) surrounding an inlet (102), the duct mounted so that the duct inlet (102) receives air from the refrigeration system outlet, the duct inlet having a height and a width; and
      a body (112) extending from the duct inlet to an outlet (104) and having a body interior that laterally outwardly diverges and upwardly shifts from the duct inlet toward the duct outlet, the body having:
         a proximal trunk (130);
         a plurality of distal branches (132A-132D); and
         a plurality of walls (134A-134C), wherein the plurality of walls divide the plurality of distal branches, each wall comprising at least one first portion protruding upward from a bottom sheet of the body and at least two second portions protruding downward from a top sheet of the body, said at least one first portion and said at least two second portions meeting between said top and bottom sheets; and wherein one or more of the walls includes an interrupted portion (186), the interrupted portion formed by deformation of the bottom sheet so that the bottom and top sheets fuse at a location locally coplanar with the top sheet, and said interrupted portion being located between the at least two second portions of a respective wall of said one or more of the walls.

13. The transport refrigeration system of claim 12 wherein:
the duct comprises thermoplastic polyolefin.

* * * * *